May 4, 1965 R. W. COOK 3,181,242
STRAIGHTEDGE ATTACHMENT FOR TAPE MEASURE
Filed Aug. 3, 1964
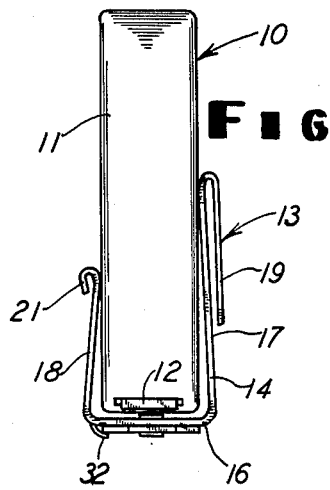
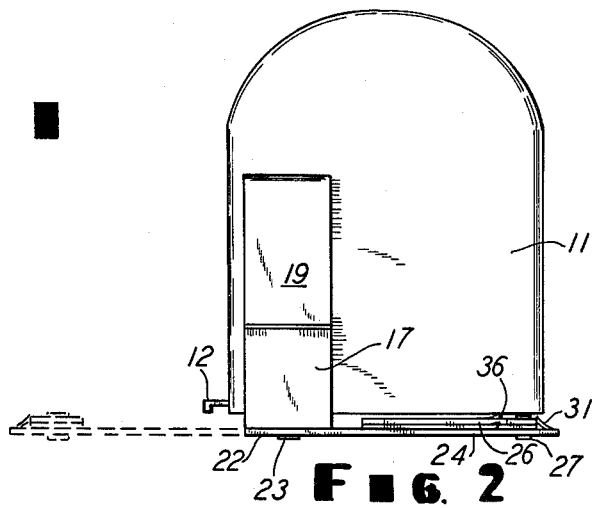
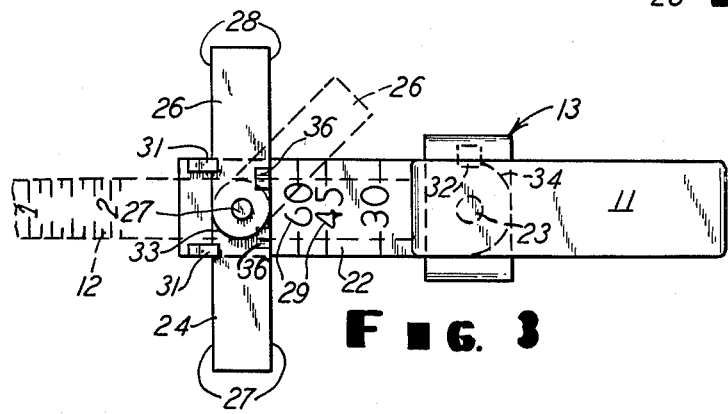
INVENTOR:
ROBERT W. COOK
BY: *Arthur J. Hansmann*
ATTORNEY 3,181,242
STRAIGHTEDGE ATTACHMENT FOR
TAPE MEASURE
Robert W. Cook, 1715 Center St., Racine, Wis.
Filed Aug. 3, 1964, Ser. No. 386,970
6 Claims. (Cl. 33—75)

This invention relates to an attachment for a tape measure, and more particularly it relates to a straightedge attachment for a tape measure wherein the straightedge will indicate the extent of the tape measure and it will serve as a guiding edge for marking or the like.

It is a general object of this invention to provide an attachment for a tape measure wherein the attachment may be disposed between a retracted and concealed position with respect to the tape measure and it can be extended to an operative position which will indicate the extension of the tape.

Another object of this invention is to provide an attachment for a tape measure which will both indicate the amount or length to which the tape is extended and will serve as a straightedge for marking the exact extended length.

Still a further object of this invention is to provide an attachment for a tape measure wherein the extended length of the tape can be marked by means of a straightedge on either side of the tape, and also wherein the marking can be made either transverse to the length of the tape or at selected angles thereto.

Still a further object of this invention is to provide an attachment for a tape measure which can be readily and easily manufactured and which can be readily and easily attached to and detached from the conventional and well-known type of tape measure having a housing and a tape therein.

Still a further object of this invention is to provide an attachment for a tape measure which will hold the tape of the conventional type which is spring retractable, and it will hold the tape extended in any selected position by a simple and efficient means.

Other objects and advantages become apparent upon reading the following description in light of the accompanying drawings wherein:

FIG. 1 is a front elevational view of a conventional type tape measure and a preferred embodiment of an attachment of this invention.

FIG. 2 is a side elevational view of FIG. 1 and showing the attachment in the extended position in dotted lines.

FIG. 3 is a top plan view of FIG. 2 with the tape measure and the attachment extended, and with one part thereof shown in a second position in dotted lines.

The drawings show a conventional type of tape measure, generally designated 10 and it includes the housing 11 and the tape 12. This is indicated to be the type of tape measure which has the tape 12 on a spring-loaded spool within the housing 11 such that the tape 12 will automatically retract when it is extended from the housing and released. A spring and spool are not shown and they will of course be well known to one skilled in the art.

The contribution herein is the attachment generally designated 13, and it includes the clip portion 14 having a U-shape in FIG. 1 with the intermediate portion 16 and the leg portions 17 and 18. The portion 17 has a shape such that it includes the end 19 so that it can be hooked onto a belt of a person, or any other place, to retain the entire unit. Also the portion 18 has a looped end 21 which will carry a pencil or stylus used for marking, though the stylus is not shown herein.

A first pivotal member 22 is pivotally mounted on the attachment means 14 by means of the rivet 23. FIG. 2 of course shows that the pivotal member 22 can be positioned between the solid line position shown and the dotted line position, with the latter of course being the extended position and with this position being in alignment with the tape 12 when the latter is extended from the housing 11 in the common use of the tape measure. It will also be understood that the length of the member 22 is substantially the same as the length of the housing 11 in the FIG. 2 view such that the housing conceals or overlaps the member 22 if the entire attachment were of course moved slightly to the left so that the housing 11 and the member 22 would then be coextensive. The extending end of the member 22 has two members 24 and 26 pivotally attached thereto by means of the rivet 27. FIG. 3 shows that the members 24 and 26 are extendable transverse to the length of the member 22. The members 24 and 26 also present straightedges 27 and 28 respectively, and it will be understood that either of the two straightedges 27 and either of the two straightedges 28 can be used for marking therealong as these edges align with selected markings on the extended tape 12 as indicated in FIG. 3.

FIG. 3 also shows that the member 26 can be disposed in any other angular position with respect to the member 22, and the latter has markings 29 which will indicate the angle between the member 22 and the member 26 shown in dotted lines. Thus the view shows the two members at a 45 degree angle. Of course the member 24 could also be disposed in any angular position with respect to the member 22 for designating the angle and the members are available for marking the angle with of course the stylus disposed in the holder 21 as mentioned.

Stops 31, of a punch-out type to present upstanding portions of the base material, such as metal in the member 22, are provided on the extending end of the member 22 to abut the edges 27 and 28 of the members 24 and 26 when the latter are in the transverse or right angle position shown in FIG. 3. These stops 31 are thus available for setting the transverse position and indicating same. Likewise, a stop 32 is provided on the portion 16 of the member 14 to obtain the extended position of alignment of the member 22 with the tape 12, as shown in FIG. 3. The edges, such as the edge 33 of the member 26 are rounded off for permitting pivoting of the member 26 without interfering with the stops 31. Likewise, the edge 34 of the member 22 is rounded to avoid interference with the stop 32.

The members 24 and 26 have punch-outs 36 which extend upwardly to receive the tape 12 thereunder so that the tape can be held by either one of the members 36 against the tendency to retract the tape by the spring.

While a specific embodiment of this invention has been shown and described, it should be obvious that certain changes could be made in the embodiment and the invention should therefore be determined only by the scope of the appended claims.

What is claimed is:

1. A straightedge attachment for a tape measure of the type having a housing and a measuring tape disposed therein and extendable therefrom adjacent the bottom of said housing, comprising attachment means for attaching to said housing and extending across said bottom, a member pivotally associated with said attachment means and having a straightedge thereon and with said member being pivotal to a position spaced from said housing and transverse and adjacent to the extension of said tape for indicating the measurement of said tape, and with said member being pivotal to a second position adjacent said housing.

2. A straightedge attachment for a tape measure of the type having a housing and a measuring tape disposed therein and extendable therefrom, comprising clip-on means releasably attachable to said housing, a first member pivotally mounted on said means and extending therefrom in alignment with the extension of said tape, a second member pivotally mounted on the extending end of said first member and extending therefrom in the direction transverse thereto for alignment with the measurement marking on said tape, and stops included in said attachment to be operative between said means and both said members for establishing the respective positions of said members.

3. A clip-on attachment for a tape measure of the type having a housing and a measuring tape disposed therein and extendable therefrom adjacent the bottom of said housing, comprising a spring-type clip-on attachment means for releasably attaching to said housing and extending across said bottom and aligning therewith, a member pivotally associated with said attachment means and having a straightedge thereon and with said member being pivotal to a position spaced from said housing and transverse and adjacent to the extension of said tape for indicating the measurement of said tape, and with said member being pivotal to a second position adjacent said housing.

4. A straightedge attachment for a tape measure of the type having a housing and a measuring tape disposed therein and extendable therefrom adjacent the bottom of said housing, comprising means attachable to said housing and extendable across said bottom, a member pivotally associated with said means and extending therefrom parallel to said tape and below the latter and having an edge for alignment with the measurement indicia on said tape, holding means on said member adjacent the edge of said tape for holding the latter in its extended position, said member being pivotal to a retracted position adjacent and parallel to said bottom.

5. A straightedge attachment for a tape measure of the type having a housing and a measuring tape disposed therein and extendable therefrom adjacent the bottom of said housing, comprising means attachable to said housing and extendable across said bottom, a first member pivotally mounted on said means and extending therefrom parallel to said tape and below the latter, a second member pivotally mounted on the extending end of said first member and extending at a selected angle to said first member and having an edge for alignment with the measurement indicia on said tape, said members having marks therebetween for indicating the angle between said members, said members being pivotal to a retracted position adjacent and parallel to said bottom.

6. A straightedge attachment for a tape measure of the type having a housing with a bottom and with a measuring tape disposed in said housing and extendable therefrom adjacent and parallel to said bottom, comprising means attachable to said housing and extending across said bottom, a first member pivotally mounted on said means on an axis transverse to said bottom and extending from said means in alignment with the extension of said tape and therebelow, and a second member pivotally mounted on the extending end of said first member and extending therefrom in the direction transverse thereto for alignment with the measurement marking on said tape.

No references cited.

ISAAC LISANN, *Primary Examiner.*